United States Patent [19]

d'Auria et al.

[11] 4,184,740
[45] Jan. 22, 1980

[54] MULTI-CHANNEL COUPLER FOR FIBRES OPTIC LINKS

[75] Inventors: Luigi d'Auria; Jacques Dubos; André Jacques, all of Paris, France

[73] Assignee: Thomson-CSF, Paris, France

[21] Appl. No.: 837,412

[22] Filed: Sep. 28, 1977

[30] Foreign Application Priority Data

Oct. 1, 1976 [FR] France .................... 76 29608

[51] Int. Cl.² .............................................. G02B 5/14
[52] U.S. Cl. ................................. 350/96.16; 350/96.20
[58] Field of Search .............. 350/96.15, 96.16, 96.20, 350/96.21, 96.22

[56] References Cited

U.S. PATENT DOCUMENTS

| | | | |
|---|---|---|---|
| 3,874,780 | 4/1975 | Love | 350/96.16 |
| 3,883,222 | 5/1975 | Gunderson | 350/96.16 |
| 3,883,223 | 5/1975 | Hudson | 350/96.16 |
| 3,901,581 | 8/1975 | Thiel | 350/96.16 |
| 3,936,141 | 2/1976 | Milton | 350/96.16 |
| 3,937,557 | 2/1976 | Milton | 350/96.16 |
| 4,027,153 | 5/1977 | Käch | 350/96.16 X |

FOREIGN PATENT DOCUMENTS

| | | | |
|---|---|---|---|
| 815181 | 10/1961 | Fed. Rep. of Germany | 350/96.16 |
| 2651800 | 5/1977 | Fed. Rep. of Germany | 350/96.16 |
| 1420458 | 1/1976 | United Kingdom | 350/96.15 |

OTHER PUBLICATIONS

Arnaud, "Transverse Coupling in Fiber Optics Part III: Bending Losses", *Bell System Tech. Journal*, vol. 53, No. 7, Sep. 1974, pp. 1379–1394.

Burke et al., "Fiber Optic Repeater Bypass Switch", *IBM Tech. Discl. Bulletin*, vol. 18, No. 2, Jul. 1975, pp. 481–482.

*Primary Examiner*—F. L. Evans
*Assistant Examiner*—John D. Lee
*Attorney, Agent, or Firm*—Cushman, Darby & Cushman

[57] ABSTRACT

The invention provides a multi-channel optical coupler forming a single component which can be attached to the front panel of an equipment. A single central U-shaped optical fibre acts as a mixer waveguide. The terminal faces of this central waveguide are coplanar and optically connected to the single fibres or to the bunches of fibres, which constitute the incoming and outgoing channels, by two sets of single intermediate mixer fibres. Each intermediate fibre is equipped with a standard mechanical connecting element of detachable design, all these connecting elements being arranged in the same plane.

7 Claims, 4 Drawing Figures

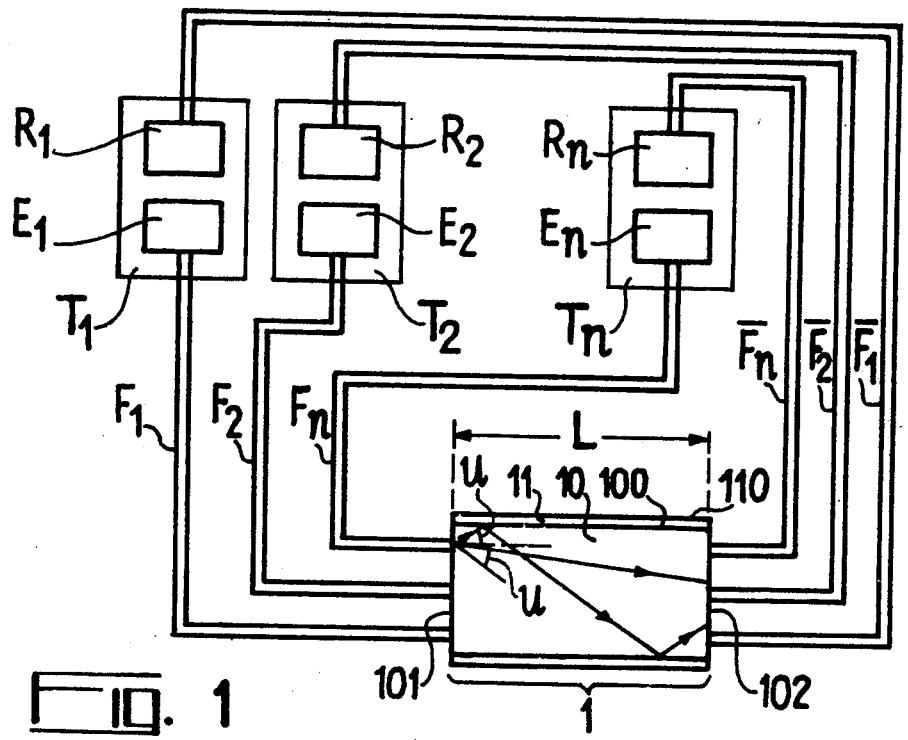
FIG. 1
PRIOR ART
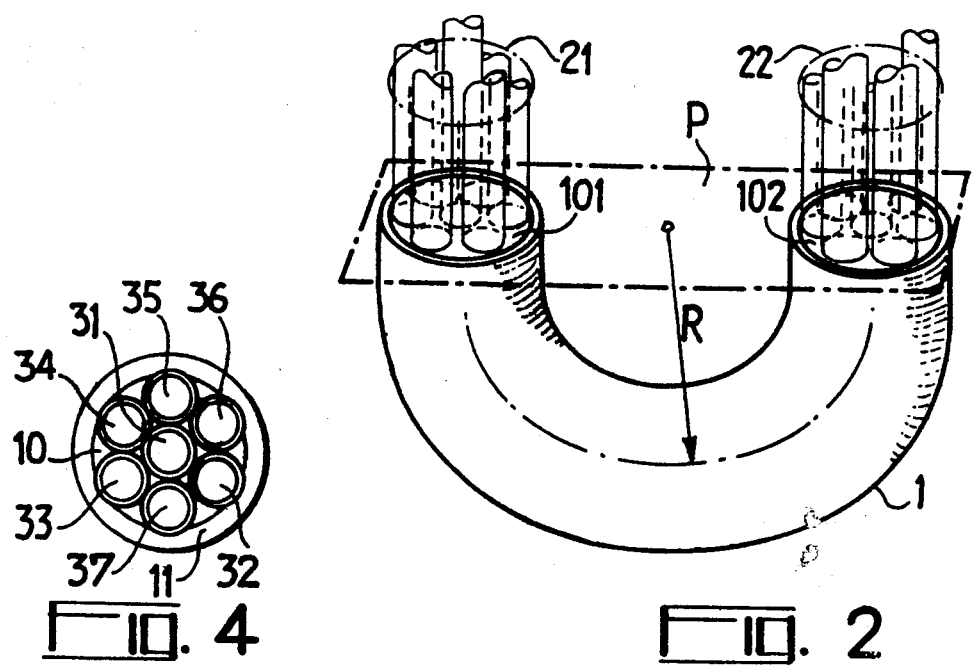
FIG. 4
FIG. 2

MULTI-CHANNEL COUPLER FOR FIBRES OPTIC LINKS

FIELD OF THE INVENTION

The present invention relates to a multi-channel coupler for fibre optic links and more specifically to a multi-channel coupler forming a single component which can be attached on the front panel of an equipment.

BACKGROUND OF THE INVENTION

Multi-channel couplers have been conceived to meet the requirement which arises, when it is necessary to establish a conversational link via an optical channel between several terminals without passing through a switching centre, to be able to connect each of the transmitters to all of the receivers.

To avoid complex solutions which consist either in connecting each transmitter to each receiver through a separate optical channel or in dividing (by the use of $2^n-1$ cascade-connected splitter arrangements) the single optical channel leaving a receiver into $2^n$ channels each terminating at a receiver, it has been proposed that a central mixer unit should be used which, on as many optical channels as there are transmitters, receives the signal sent by these latter, mixes them and then distributes them between as many optical channels as there are receivers. A unit of this kind is constituted by a light waveguide limited by a lateral cylindrical surface generally of right circular section, and by two flat terminal faces perpendicular to the axis, which constitute the input and output faces; the section of the waveguide is sufficiently large to arrange for it to be possible to dispose side by side on these faces the apertures of the fibres or bunches of fibres respectively emanating from the transmitters or going toward the receivers; in addition, the length of the waveguide is sufficient to contrive that the radiation emitted by a fibre, whatever its position on the entry face, covers the whole of the exit face, this consequently enabling the waveguide to perform its mixing function. It has also been proposed that a mirror should be arranged at one of the terminal faces; the other face then receives the transmitter and receiver fibres and consequently simultaneously fulfils the functions of input and output face.

SUMMARY OF THE INVENTION

It is an object of the present invention to replace the cylindrical mixer waveguide of prior art by a waveguide having for example a U-shaped lateral surface, such that the two terminal faces are coplanar.

It is a further object of the invention to establish the optical connection between the terminal faces of the central mixer waveguide and the optical channels, either single fibres or bunches of fibres, coming from the transmitters and receivers by means of as many intermediate waveguides as there are channels. These intermediate waveguides are combined at one of their ends into two contiguous sets so that the terminal faces of the central waveguide can receive the maximum number of channels. The other ends of these intermediate waveguides, arranged in such a fashion that the corresponding apertures are coplanar, are by contrast sufficiently separated from one another in order for each of them to be equipped with a mechanical connecting device allowing the incoming and outgoing optical channels to be plugged in and locked.

It is another object of the invention to provide a multichannel optical coupler in the form of a single lumped component which can be attached to the front panel of an item of equipment, since the incoming and outgoing connections are arranged in one and the same plane and use standard plug-in arrangements. A coupler of this kind achieves the maximum reduction in insertion losses by optimising the utilisation factor of the terminal faces of the central waveguide. Its one-piece structure means that it is strong, too. Finally, as will become apparent later on, its manufacture requires only a small number of separate components and a limited number of polishing operations, so that the cost price is limited.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however that the drawings are for the purpose of illustration and description only and are not intended as a definition of the limits of the invention.

BRIEF DESCRIPTION OF THE DRAWINGS

FIG. 1 is an explanatory diagram in accordance with the prior art, showing the operation of a multichannel coupler establishing conversational link between several terminals;

FIG. 2 is a simplified diagram of a multichannel coupler in accordance with the invention, in which the optical channels open directly on to the terminal faces of a central mixer waveguide.

FIG. 4 illustrates the relative disposition, proposed in accordance with the invention, of the apertures of the single intermediate fibres and the terminal faces of the central mixer waveguide, in the device shown in FIG. 3.

DETAILED DESCRIPTION

Figure 3:
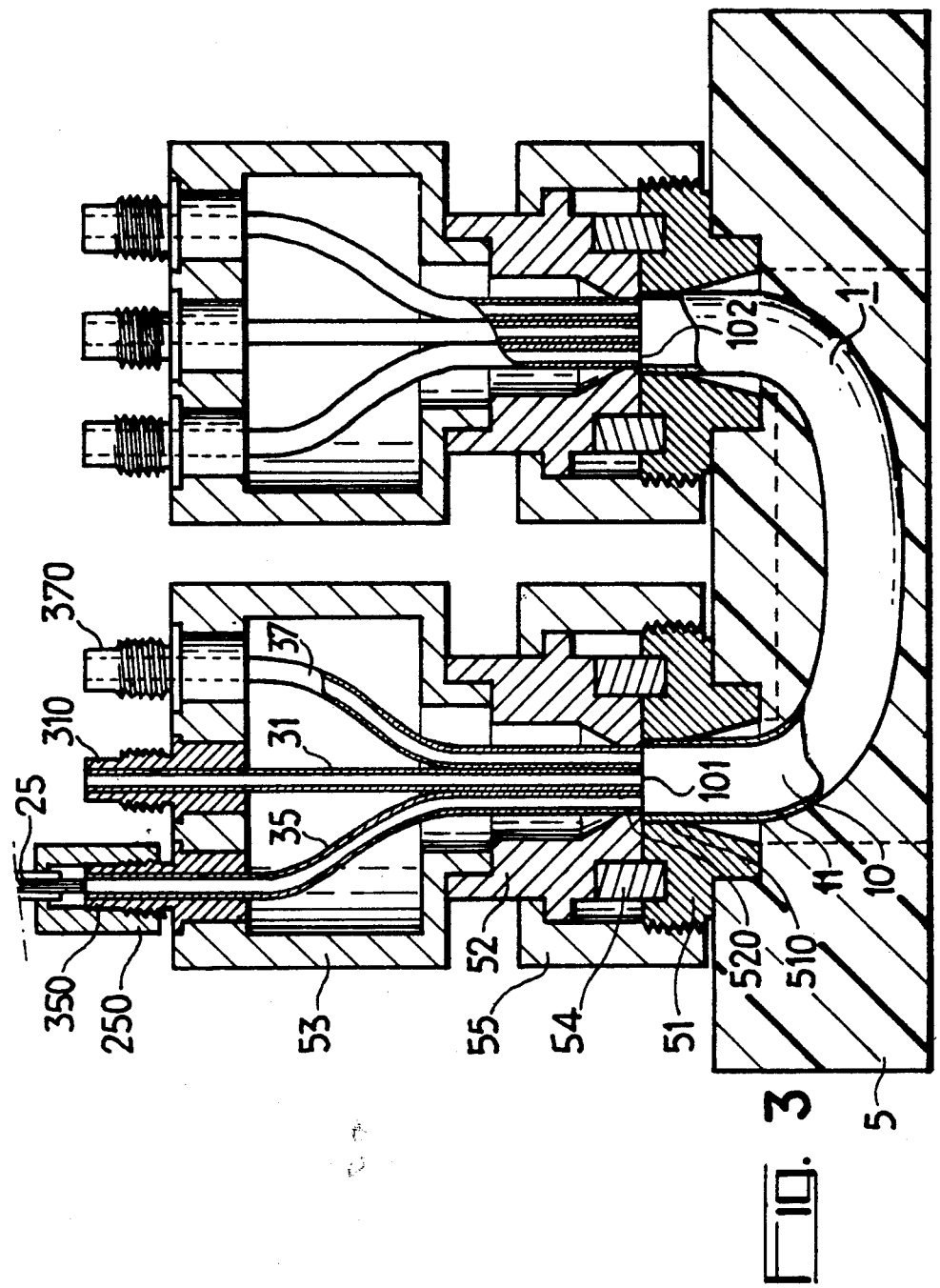
FIG. 3 is a sectional view of a preferred embodiment of a seven-channel coupler in accordance with the invention, utilising single intermediate fibres in order to establish the optical link between the incoming and outgoing fibres and the terminal faces of a central mixer waveguide.

FIG. 1 is a diagram explaining the operation, in accordance with the prior art, of a central mixer unit constituted by an optical waveguide 1, establishing a conversational link through optical fibres between n terminals $T_1 \ldots T_n$, each constituted by a transmitter $E_1 \ldots E_n$ and a receiver $R_1 \ldots R_n$.

The waveguide 1 is constituted by a section of large-diameter optical fibre formed by two media transparent vis-a-vis the radiation emitted by the transmitters E, the central medium 10, or core, having a high refractive index and the peripheral medium 11, or cladding a lower refractive index; the core and the cladding are delimited laterally by two cylindrical surface elements 100 and 110 of right circular section, which are coaxial. Two flat terminal faces, 101 and 102, delimit the fibre perpendicularly to the axis.

An optical fibre $F_1, \ldots F_n$ whose terminal aperture is attached to the face 101 of the mixer waveguide 1 respectively departs from each transmitter $E_1 \ldots E_n$; the apertures of n optical fibres $\overline{F}_1 \ldots \overline{F}_n$ which each terminate at a receiver $R_1 \ldots R_n$ are attached to the face 102 of said same waveguide.

The light rays emitted by the aperture of a fibre F form a divergent beam and, as FIG. 1 shows, are comprised, at entry into the waveguide 1, within a conical envelope whose axis is perpendicular to the input face and has an apex half-angle of u, this angle depending upon the characteristics of the fibre and upon the refractive index of the medium of which the core 10 is made. A proportion of these rays propagates directly through the core, the others experiencing one or more total reflections at the interface 100 between core and cladding. If the length L and the diameter D of the waveguide satisfy the relationship:

$$D < 4 \tan. u$$

then the radiation emitted by a fibre F, whatever the position of the aperture of the latter on the input face 101 of the waveguide 1, will completely cover the output face 102. The waveguide 1 does duty as a mixer and the radiations emitted by each of the transmitters $E_1 \ldots E_n$ are picked up by the apertures of all the fibres $\overline{F}_1 \ldots \overline{F}_n$ and thus transmitted to the assembly of receivers $R_1 \ldots R_n$. Thus, part of the luminous flux emanating from the fibres F and passing across the output face 102, is not picked up by the apertures of the fibres $\overline{F}$ due to the reflection losses and especially because of the fact that the fibre apertures, which are generally circular, cannot wholly cover said output face; the insertion losses of the mixer waveguide are therefore the less the more compact is the assembly of the apertures of the fibres $\overline{F}$ on the output face of the waveguide.

A simplified illustration of a multichannel coupler in accordance with the invention is shown in FIG. 2. This coupler is essentially constituted by a light waveguide 1 curved in such a fashion that its terminal faces 101 and 102 are arranged in a same plane P. The cross-section of the waveguide is chosen so that the surfaces of the faces 101 and 102 are sufficiently large in area to accomodate the apertures of the optical channels which are to be interconnected. For example, this cross-section may be circular and of diameter D, and the waveguide may be composed of an optical fibre with core and cladding, delimited by a half-torus of mean radius R. This optical fibre will have the same aperture number u as the optical fibres which constitute the optical channels which are to be interconnected. The radius R will therefore be made greater than the value $D/\pi \tan. u$, so that the radiation emitted by a fibre arranged at an arbitrary point on one of the terminal faces 101 (or 102) is uniformly distributed over the other face 102 (or 101). It should be noted, however, that the half-toroidal shape is in no way mandatory, any more than is the circular section and for example a U-shape and a rectangular section could equally well be chosen, the essential factors being the mean distance between the terminal faces which makes it possible to achieve the mixer function, and the coplanar arrangement of these same two faces which promotes the attainment of a high utilisation factor in the coupler.

Again considering FIG. 2, there can be seen a first and a second set of optical fibres, 21 and 22, the apertures of which are disposed substantially in the plane P respectively opposite the terminal faces 101 and 102. The number of fibres in the two sets, as well as their diameters, may differ; it is recommended, nevertheless, that all the fibres should have the same aperture number, matching the aperture number of the coupler and thus limiting the insertion losses. In addition, the same set of fibres 21 or 22 can simultaneously comprise fibres associated with receivers and others associated with transmitters thus, for example in the set 21 by coupling two fibres coming from the transmitters $E_1$, $E_2$ and two fibres leading to receivers $R_2$, $R_4$ and similarly in the set 22 by coupling four fibres coming from transmitters $E_3$, $E_4$, $E_5$, $E_6$ and two fibres leading to receivers $R_1$, $R_2$, the receivers $R_1$ and $R_2$ will simultaneously receive the signals emitted by $E_1$ and $E_2$ and the receivers $R_3$, $R_4$ likewise those emitted by $E_3$, $E_4$, $E_5$, $E_6$.

The means used to position the apertures of the two sets of fibres 21 and 22 opposite the terminal faces 101 and 102, are assumed to be constituted in accordance with known techniques, for instance held in position by adhesive or mechanically and not illustrated in detail in FIG. 2.

The device shown in FIG. 2, although offering the advantage that it can be arranged upon the front panel of a piece of equipment while providing direct access to the two terminal faces of the coupler, nevertheless, has drawbacks in relation to certain operating configurations. Adhesive links preclude the changing of incoming and outgoing connections. Mechanical links, for their part, make it necessary to simultaneously withdraw all the channels of a set 21 or 22, since it is impossible, for reasons of bulk, to individually connect each channel to one of the terminal faces of the coupler.

FIGS. 3 and 4 illustrate a preferred embodiment of a multichannel coupler in accordance with the invention, designed to overcome the drawbacks enunciated earlier while conserving extreme simplicity of design of the devices. These above objects are accomplished by effecting the optical connection between the fibres or bunches of fibres belonging to incoming and outgoing directions, and the terminal faces of the central mixer unit, by means of intermediate single fibres.

FIG. 3 illustrates a sectional view in a plane of symmetry of a coupler of this kind, designed to handle seven incoming channels and seven outgoing channels. The central mixer unit 1 can be seen there, formed here by a glass fibre of circular cross-section comprising a core 10 1.83 mm in diameter and a sheath 11 2.00 mm in diameter (external diameter). This fibre is U-shaped; its aperture number is identical to that of the optical fibres making up the incoming and outgoing channels. Its length is linked to its aperture number and to its diameter by the earlier mentioned relation which gives it its mixing property. The central mixer fibre 1 is arranged in a methylpolymethacrylate mounting 5 and its two ends are held in two identical brass washers 51 each containing a drilling 510 and force-fitted in the mounting 5. The two terminal faces 101 and 102 of the fibre 1 are arranged in the same plane, parallel to the base of the mounting 5.

Two identical assemblies, each made up of seven intermediate optical waveguides 31 to 37 extend the arms of the U formed by the fibre 1; each intermediate waveguide is formed by a single optical fibre of circular crc s-section comprising a 0.595 mm diameter core and a cladding which raises the overall diameter to 0.61 mm. The fibre 31 is straight; six others 32 to 37 which are identical to one another, exhibit a double bend giving them a general S-shape and are arranged in hexagonal symmetry about the fibre 31; FIG. 3 simply shows the three fibres 31, 35 and 37. All the fibres have their apertures arranged in two parallel planes. They have the same aperture number as the central fibre 1 and a sufficient length to operate like the latter, as mixer fibres. FIG. 4 illustrates the arrangement of the aperture located opposite the terminal faces of the central mixer fibre 1; the ends of the fibres are contiguous and form a compact hexagonal arrangement circumscribed by the circle delimiting the cross-section of the core of the central fibre 1.

Referring again to FIG. 3, it will be seen that the assembly of intermediate fibres is held in a mounting formed by two brass components 52 and 53 which fit one into the other. A ring 54 makes it possible to align the components 51 and 52 on the same axis; the clamping ring 55, when screwed on to the component 51, makes it possible to attach the mounting for the intermediate components, to the base 5. The component 52 contains a bore 520 having a diameter substantially equal to the core of the fibre 1 and maintaining the first ends of the intermediate fibres 31 to 37 in a compact assembly. The second ends of the intermediate fibres are secured in the front face of the component 53 by standard male connecting elements 310 to 370 which make it possible to individually connect each of the incoming or outgoing optical channels. The end of a bunch of fibres 25 constituting this kind of channel has been illustrated by way of example, still in FIG. 3, as connected to the intermediate fibre 35 through a female connecting element 250 cooperating with a male element 350. Each optical channel, single fibre or bunch of fibres, is thus associated with an intermediate fibre which establishes the optical link with the terminal face.

The assembly of the coupler is effected in the following way; the base 5 contains a slot and two drillings corresponding to the apertures 510 formed in the components 51 to receive the ends of the U fibre. With the two components 51 fixed to the base, the central fibre 1, now in its final form, is introduced into the slot in such a fashion that its ends are aligned flush with the openings of the drillings 510. The slot and the drillings are then filled with a polyester resin which is polymerised and holds the fibre in place. The terminal faces 101 and 102 of the fibre 1 and of the components 51 are then polished in one operation.

In the meantime, the intermediate fibres 31 to 37 will have been stuck into the connectors mounted on the component 53 and the component 52 attached to the latter, this component holding the ends of these fibres in a bunch in the opening 520 where they are likewise stuck in place. A single polishing operation gives the requisite surface finish simultaneously to the second terminal faces assembly of the intermediate fibres and to the connectors terminal faces; the simultaneous surfacing of intermediate fibres first terminal faces assembly and component 52 terminal face is achieved during another single polishing operation.

The two assemblies of intermediate fibres, thus placed in position in their respective mountings, are then arranged in extension of the central mixer fibre in position in the base 5, through the agency of the rings 54 and the clamping rings 55.

It should be pointed out that the manufacture of this coupler is very much simplified on the one hand by the fact that the intermediate fibres occur in only two different types and on the other by the facility which is created for finishing the surfaces of all of the first or second terminal faces of the same intermediate fibres in a single polishing operation.

Couplers with 19, 31, 37, 43 . . . channels respectively using 4, 5, 6 and 7 different types of intermediate fibres collected at one of their ends into a compact assembly exhibiting senary symmetry, can be created in accordance with the same principle.

The incoming and outgoing optical channels can be constituted by a single optical fibre or bunches of such fibres. The locking of these channels to the coupler is performed either independently in the case of each of them, as shown in FIG. 3, or by the use of multichannel connectors identical to those used in electrical work.

The insertion losses of the seven-channel coupler shown in FIG. 3, are of the order of 17 db.

What we claim is:

1. A multichannel coupler for fibres optic links, enabling a first and a second plurality of optical fibres to be interconnected and comprising a simple central mixing optical monofibre limited by a first and a second terminal face respectively associated with said first and said second plurality for distributing between the apertures of the fibres of the associated plurality at least part of the radiation received by the other terminal face and originating from the aperture of an arbitrary one of the fibres of the other plurality; said first and said second terminal faces being arranged in a same first plane.

2. A coupler as claimed in claim 1, further comprising a first and a second set of single intermediate mixing optical monofibre respectively associated with said first and said second face for optically respectively linking the apertures of the optical fibres of said first and second pluralities, respectively with said first and said second terminal faces; each said intermediate optical monofibre terminating in a first and a second orifice; said first orifices being arranged in a same second plane substantially coincidental with said first plane, those of the first and those of the second set being respectively collected together opposite said first and said second terminal faces; said second orifices being arranged in a same third plane parallel to the first and provided with individual mechanical connecting means for arranging them opposite the apertures of the fibres of said first and second pluralities.

3. A coupler as claimed in claim 2, wherein said intermediate monofibres having identical circular cross-sections, said first orifices are arranged in said second plane to form a compact hexagonal assembly.

4. A coupler as claimed in claim 3, wherein one of said intermediate monofibres of each set is rectilinear; the others being distributed around it in accordance with a senary symmetry.

5. A coupler as claimed in claim 2, wherein the fibres of said first and second pluralities being united in bunches, each said set comprises as many of said intermediate monofibres as there are bunches in the associated plurality; each intermediate monofibre distributing over the whole of any one of its orifices the radiation emitted at an arbitrary point of the other orifice.

6. A coupler as claimed in claim 2, wherein said intermediate monofibres have the same aperture number as said central monofibre.

7. A coupler as claimed in claim 1, wherein said central monofibre has the same aperture number as the fibres of said first and second pluralities.

* * * * *